US010430420B2

(12) United States Patent
Galvin, Jr. et al.

(10) Patent No.: US 10,430,420 B2
(45) Date of Patent: *Oct. 1, 2019

(54) WEIGHTING SENTIMENT INFORMATION

(71) Applicant: International Business Machines Corporation, Armonk, NY (US)

(72) Inventors: James P. Galvin, Jr., Georgetown, KY (US); Amy D. Travis, Arlington, MA (US); Sara B. Weber, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 983 days.

This patent is subject to a terminal disclaimer.

(21) Appl. No.: 13/969,254

(22) Filed: Aug. 16, 2013

(65) Prior Publication Data

US 2015/0051946 A1 Feb. 19, 2015

(51) Int. Cl.
  *G06F 16/9535* (2019.01)
  *G06F 16/2457* (2019.01)
  *G06Q 30/02* (2012.01)

(52) U.S. Cl.
  CPC .... *G06F 16/24578* (2019.01); *G06F 16/9535* (2019.01); *G06Q 30/0201* (2013.01)

(58) Field of Classification Search
  CPC .......... G06F 17/3053; G06F 17/30643; G06F 17/30651; G06F 17/30696; G06F 17/30867; G06F 17/30029; G06F 16/24578; G06F 16/252; G06F 16/951; G06F 16/3323; G06F 16/3325; G06F 16/9017; G06F 16/9535

USPC ................................................. 707/723, 731
See application file for complete search history.

(56) References Cited

U.S. PATENT DOCUMENTS

| | | | |
|---|---|---|---|
| 8,484,217 B1* | 7/2013 | Srivastava | G06F 16/951 707/738 |
| 9,152,312 B1* | 10/2015 | Terleski | G06F 3/0488 |
| 9,900,277 B2* | 2/2018 | Dumpeti | G06Q 10/10 |
| 2004/0122936 A1 | 6/2004 | Mizelle et al. | |
| 2007/0143345 A1* | 6/2007 | Jones | G06F 17/30241 |
| 2008/0040653 A1 | 2/2008 | Levine | |
| 2010/0042944 A1 | 2/2010 | Robinson et al. | |
| 2011/0119258 A1 | 5/2011 | Forutanpour et al. | |
| 2011/0145219 A1* | 6/2011 | Cierniak | G06F 17/30867 707/709 |
| 2011/0307312 A1 | 12/2011 | Goeldi | |
| 2012/0054278 A1 | 3/2012 | Taleb et al. | |
| 2012/0102053 A1* | 4/2012 | Barrett | G06F 17/30592 707/754 |
| 2012/0215903 A1 | 8/2012 | Fleischman et al. | |
| 2012/0284648 A1* | 11/2012 | Marshall | G06Q 50/01 715/753 |
| 2012/0317049 A1 | 12/2012 | Hao et al. | |
| 2013/0018957 A1* | 1/2013 | Parnaby | G06Q 10/10 709/204 |
| 2013/0204940 A1* | 8/2013 | Kinsel | G06Q 30/02 709/204 |

(Continued)

*Primary Examiner* — James Trujillo
*Assistant Examiner* — Fariborz Khoshnoodi
(74) *Attorney, Agent, or Firm* — Fabian VanCott; Steven L. Nichols

(57) ABSTRACT

Weighting sentiment information includes capturing sentiment information of a post from an electronic source, categorizing the post into categories based on the sentiment information, and assigning a weight to the post based on an interest attribute.

20 Claims, 6 Drawing Sheets

(56) References Cited

U.S. PATENT DOCUMENTS

2014/0188993 A1* 7/2014 Klein ................... G06Q 10/063
                                                    709/204
2014/0289611 A1* 9/2014 Norwood .............. H04L 51/046
                                                    715/234

* cited by examiner

WEIGHTING SENTIMENT INFORMATION

BACKGROUND

The present invention relates to capturing sentiment information of a post from an electronic source, such as a social media website, and more specifically, to assigning a weight to the post based on an interest attribute.

A social media website is a web based application that allows a user to share information, such as the user's sentiment about a company's products or services, with other users on the social media website. A user may share their sentiment about a company's products or services by making a post, commenting on a post, or liking a post about the company's products or services. Further, a company may analyze the user's sentiment about the company's products or services to give the company feedback on how their products or services are perceived in the market.

BRIEF SUMMARY

A method for weighting sentiment information includes capturing sentiment information of a post from an electronic source, categorizing the post into categories based on the sentiment information, and assigning a weight to the post based on an interest attribute.

A method for weighting sentiment information includes capturing sentiment information of a post from an electronic source, categorizing the post into categories based on the sentiment information, assigning a weight to the post based on an interest attribute, and parsing the sentiment information of the post based on the interest attribute to create parsed sentiment information.

A method for weighting sentiment information includes categorizing the post into categories based on the sentiment information, and assigning a weight to the post based on an interest attribute.

A computer program product includes a computer readable storage medium, the computer readable storage medium having computer readable program code embodied therewith. The computer readable program code having computer readable program code to capture sentiment information of a post from an electronic source, categorize the post into categories based on the sentiment information, and assign a weight to the post based on an interest attribute.

A system for weighting sentiment information includes a capturing engine to capture sentiment information of a post from an electronic source, a categorization engine to categorize the post into categories based on the sentiment information, an assigning engine to assign a weight to the post based on an interest attribute, and an interest attribute parsing engine to parse the sentiment information of the post based on the interest attribute to create parsed sentiment information.

A system for weighting sentiment information includes a categorization engine to categorize a post into categories based on sentiment information, and an assigning engine to assign a weight to the post based on an interest attribute.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
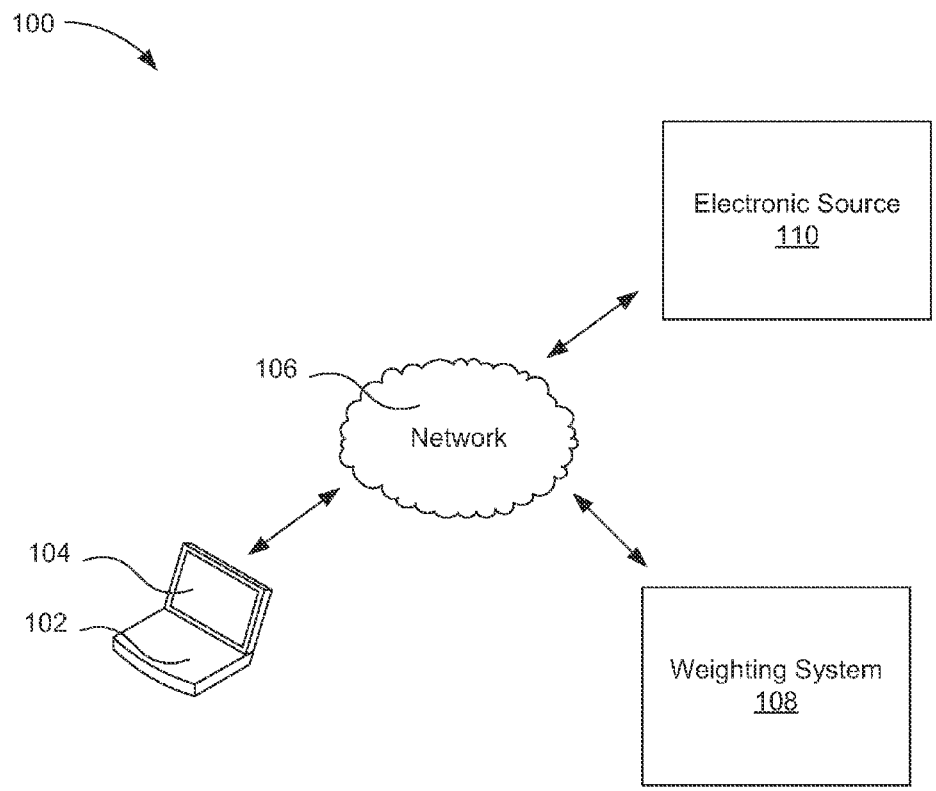
FIG. 1 is a diagram of an example of a system for weighting sentiment information, according to one example of principles described herein.

The present specification describes a method and system for assigning a weight to a post based on an interest attribute such that a post from one user may be of greater interest than a post from another user.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

As mentioned above, a user may share their sentiment about a company's products or services by making a post, commenting on a post, or liking a post about the company's products or services. Further, a company may analyze the user's sentiment about the company's products or services to give the company feedback on how their products or services are perceived in the market.

Although, a user may share their sentiment about a company's products or services, each user who shares their sentiment about the company is treated as equally relevant. For example, if a user makes a post about a company's products or services and the user does not uses the company's products or services, the user's sentiment in the post is treated as equally relevant as a sentiment of a post that another user makes about the company's products or services that uses the company's products or services. As a result, when a company analyzes the users's sentiment about the company's products or services, the company may not receive accurate feedback on how their products or services are perceived in the market.

The principles described herein include a system and a method for weighting sentiment information. Such a method includes capturing sentiment information of a post from an electronic source, categorizing the post into categories based on the sentiment information, and assigning a weight to the post based on an interest attribute. Such a method allows posts of more interest to a company to have a greater weight. As a result, when displaying sentiment information of the posts to a company for further analysis, the weights assigned to the posts allow a company to better understand the overall sentiment of the posts according to the selected interest attributes such that a company may receive accurate feedback on how their products or services are perceived in the market.

Further, the method can include referencing an interest attribute database. In one example, an interest attribute database includes a social network identification attribute, a network size attribute, a company name attribute, a job title attribute, a social network weight attribute or combinations thereof. Referencing an interest attribute database will be described in more detail below.

An electronic source may be a social media website, a blog, a forum, other forms of social media, or combinations thereof. Further, the electronic source allows users create posts, to comment on posts, like a post, or combinations thereof.

A post may be an initial post or a comment. Further, a post may be about a product, a person, an event, a business, a meeting, other types of post, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for weighting sentiment information, according to one example of principles described herein. As will be described below, a weighting system is in communication with a network to capture and weight sentiment information of posts from an electronic source such as a social media website. Further, the weighting system assigns a weight to the posts based on an interest attribute that a user selects. In one example, a post that is assigned a weight based on an interest attribute may be of greater interest to a company. As a result, when displaying sentiment information of the posts to a company for further analysis, the weights assigned to the posts allow a company to better understand the overall sentiment of the posts according to the selected interest attributes such that a company may receive accurate feedback on how their products or services are perceived in the market.

As mentioned above, the system (100) includes a user device (102) with a display (104). In one example, a user that represents a company uses the user device (102) to access a network (106). In one example, the network (106) may include an electronic source (110). In this example, the electronic source (110) stores, in memory, a social network service. In keeping with the example, the social network service includes an activity stream to display posts that include sentiment information. As will be described below, a weighting system (108) assigns a weight to a post based on an interest attribute.

As mentioned above, the system (100) further includes a weighting system (108). As will be described below, the weighting system (108) captures sentiment information of a post from an electronic source (110). The weighting system (108) categorizes the post into categories based on sentiment information. The weighting system (108) assigns a weight to the post based on an interest attribute. The weighting system (108) parses the sentiment information of the post based on the interest attribute to create parsed sentiment information. Finally, the weighting system (108) displays the parsed sentiment information to a user via a display (104). The weighting system (108) will be described in more detail below.

While this example has been described with reference to the weighting system being located over the network, the weighting system may be located in any appropriate location according to the principles described herein. For example, the weighting system may be located in a user device, a server, or combinations thereof. In some examples, the weighting system assigns a weight to a post based on one interest attribute. In other examples, the weighting system assigns a weight to a post based on multiple interest attribute.

Figure 2:
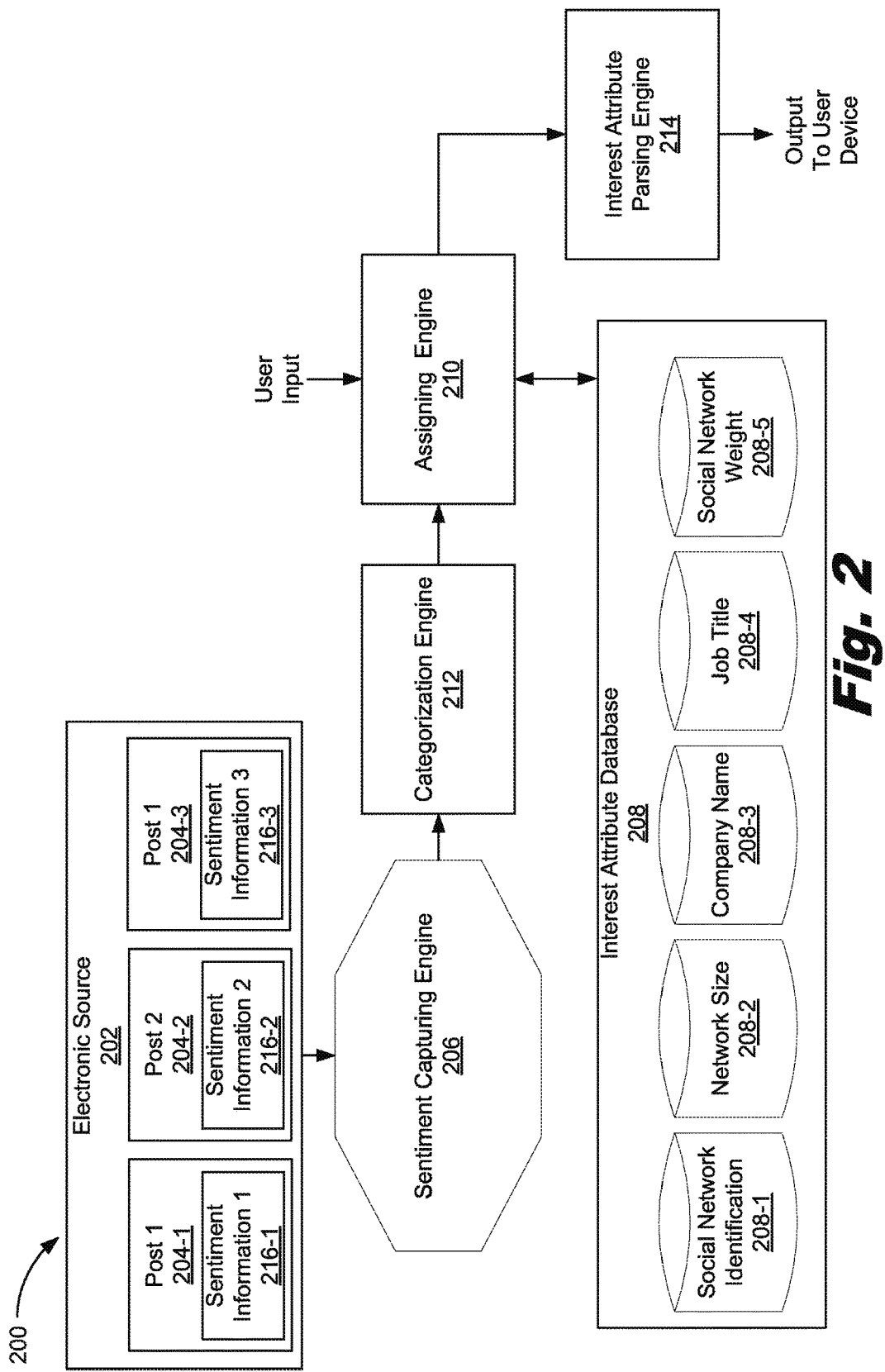
FIG. 2 is a diagram of an example of a weighting system, according to one example of principles described herein.

FIG. 2 is a diagram of an example of a weighting system (200), according to one example of principles described herein. As mentioned above, the weighting system (200) captures sentiment information of a post from an electronic source. Further, the weighting system (200) assigns a weight to the post based on an interest attribute. As will be described below, the sentiment information may come from a number of posts from a number of electronic sources. Further, an interest attribute database is referenced to allow an assigning engine to assign a weight to the post based on an interest attribute. In one example, if a user that represents a company selects interest attribute X, a post having interest attribute X may be assigned a weight of 1. Further, all other posts that do not have interest attribute X may be assigned a default weight of 0. As a result, when displaying parsed sentiment information of the posts to a company for further analysis, the weights assigned to the posts allow the company to better understand the overall sentiment of the posts according to the selected interest attributes such that a company may receive accurate feedback on how their products or services are perceived in the market.

As mentioned above, sentiment information may come from a number of posts (204) from a number of electronic sources (202). In one example, an electronic source (202) may be a social media website. In another example, an electronic source (202) may be a blog. In yet another example, an electronic source (202) may be a forum. In this example, an electronic source (202) contains three posts, namely post 1 (204-1), post 2 (204-2), and post 3 (204-3) about product X. Further, post 1 (204-1) includes sentiment information 1 (216-1). In this example, sentiment information 1 (216-1) is a user's attitude towards product X. Further, post 2 (204-2) includes sentiment information 2 (216-2). In this example, sentiment information 2 (216-2) is a user's attitude towards product X. Further, post 3 (204-3) includes sentiment information 3 (216-3). In this example, sentiment information 3 (216-3) is a user's attitude towards product X.

In one example, a sentiment capturing engine (206) captures the sentiment information (216) of the posts (204) from the electronic sources (202). As a result, sentiment information is captured from an electronic source. Further, in one example, the sentiment capturing engine (206) stores the sentiment information (216) in a database to be further processed by the weighting system (FIG. 1, 108) at a later time. In another example, the sentiment capturing engine (206) captures the sentiment information (216) in real time to be analyzed by the weighting system (FIG. 1, 108) in real time. Further, the sentiment capturing engine (206) may capture sentiment information from posts that are indicated to be of interest to a user that represents a company. In this example, the sentiment capturing engine (206) uses data text mining to identify posts that are to be captured. For example, if post 1 (204-1) is identified to contain information that is relevant to a company, sentiment information 1 (216-1) is captured by the sentiment capturing engine (206).

The weighting system (FIG. 1, 108) further includes a sentiment categorizing engine (206). In one example, the sentiment categorizing engine (206) categorizes the posts (204) into categories based on the sentiment information (216) from the posts (204). In one example, the categories for the posts (204) include a positive sentiment category, a neutral sentiment category, or a negative sentiment category, or combinations thereof. In this example, sentiment information 1 (216-1) may be a positive post about product X. As a result, post 1 (204-1) may be categorized in the positive sentiment category. Further, sentiment information 2 (216-2) may be a neutral post about product X. As a result, post 2 (204-2) may be categorized in the neutral sentiment category. Still further, sentiment information 3 (216-3) may be a negative post about product X. As a result, post 3 (204-3) may be categorized in the negative sentiment category.

As mentioned above, the weighting system (FIG. 1, 108) includes an assigning engine (210). The assigning engine (210) assigns a weight to a post based on an interest attribute. In one example, the assigning engine (210) references an interest attribute database (208). In this example, the interest attribute database (208) includes a social network identification attribute (208-1), a network size attribute (208-2), a company name attribute (208-3), a job title attribute (208-4), a social network weight attribute (208-5). Further, the interest attribute database (208) allows a user that represents a company to indicate posts that are relevant to be displayed to the company for further analysis.

As mentioned above, the assigning engine (210) references the interest attribute database (208) that includes the social network identification attribute (208-1) database. In one example, the social network identification attribute (208-1) database contains information about users on a social network. For example, the social network identification attribute (208-1) database may contain identification names, identification numbers, or combinations thereof for users that have an account on a social media website. In this example, the assigning engine (210) allows a user that represents a company to assign a weight to specific users that create posts on the social media website. As a result, if a post is made by the specific user, the post is assigned a weight.

As mentioned above, the assigning engine (210) references the interest attribute database (208) that includes the network size attribute (208-2) database. In one example, the network size attribute (208-2) database contains different sized networks for a social network. For example, the network size attribute (208-2) database may contain a network size of one-thousand users. In another example, the network size attribute (208-2) database may contain a network size of ten-thousand users. In this example, the assigning engine (210) allows a user that represents a company to assign a weight to specific a specific network size. As a result, if a post is made by a user in the specific network size, the post is assigned a weight.

As mentioned above, the assigning engine (210) references the interest attribute database (208) that includes the company name attribute (208-3) database. In one example, the company name attribute (208-3) database contains names of different companies. For example, the company name attribute (208-3) database may contain a company X, company Y, company Z, other company names, or combinations thereof. In this example, the assigning engine (210) allows a user that represents a company to assign a weight to specific company name. As a result, if a post is made by the specific company name, the post is assigned a weight.

As mentioned above, the assigning engine (210) references the interest attribute database (208) that includes the job title attribute (208-4). In one example, the job title attribute (208-4) database contains information job titles. For example, a job title attribute (208-4) database may contain job titles such as chief executive officer, chief financial officer, vice president, president, manager, employee, other job titles, or combinations thereof. In this example, the assigning engine (210) allows a user that represents a company to assign a weight to a specific job title. As a result, if a post is made by a specific user having the specific job title, the post is assigned a weight.

As mentioned above, the assigning engine (210) references the interest attribute database (208) that includes the social network weight (208-5) database. In one example, the social network weight (208-5) database contains information about social networks. For example, the social network weight (208-5) database may contain social network names such as, social network X, social network Y, social network Z, other social network names, or combinations thereof. In this example, the assigning engine (210) allows a user that represents a company to assign a weight to a specific social network. As a result, if a post is made on the specific social network, the post is assigned a weight.

As mentioned above, the weighting system (FIG. 1, 108) includes an interest attribute parsing engine (214). In one example, the interest attribute parsing engine (214) parses the sentiment information (216) of the posts (204) based on the interest attribute to create parsed sentiment information. In one example, the sentiment information (216) of the posts (204) may be parsed according to a social network identification attribute, a network size attribute, a company name attribute, a job title attribute, a social network weight attribute, or combinations thereof. Further, the parsed sentiment information may be sent to a user device. As will be described in later parts of this specification, the parsed sentiment information is displayed on the user device via a display.

While this example has been described with reference to the weighting system using a sentiment capturing engine and a sentiment categorizing engine, the weighting system may use existing tools that analyze posts and categorize the posts based on the sentiment information from the posts. As a result, a weighting system may receive sentiment analysis results from existing tools. For example, the existing tools may collect sentiment information from a number of posts and categorize the posts based on the post's sentiment information. Further, the existing tools may store the sentiment information as sentiment analysis results in a database. The weighting system may then receive the sentiment analysis results from the database, assign a weight to the sentiment analysis results, and parse the sentiment analysis results.

Figure 3:
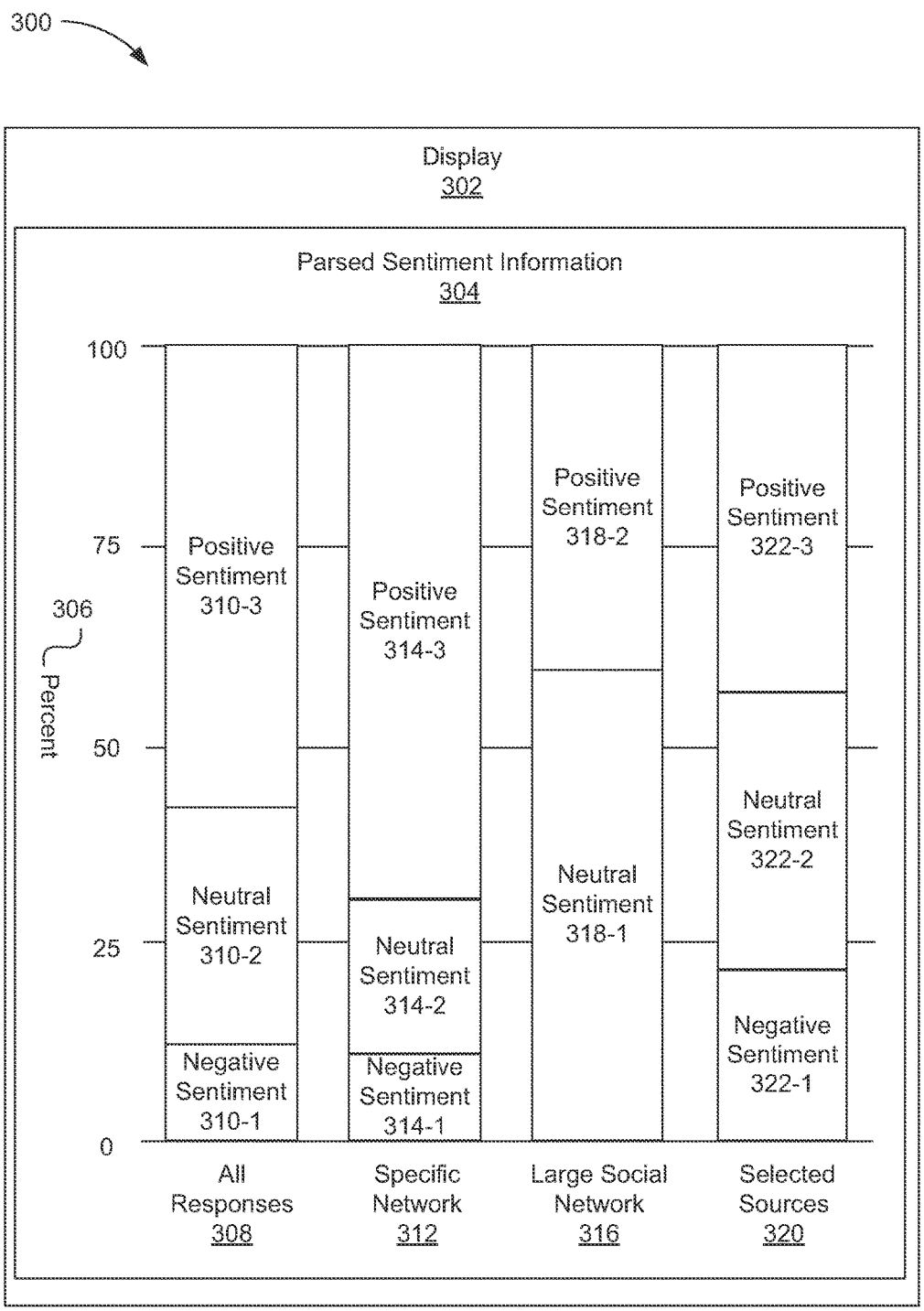
FIG. 3 is a diagram of an example of displaying parsed sentiment information to a user via a display, according to one example of principles described herein.

FIG. 3 is a diagram of an example of displaying parsed sentiment information to a company via a display, according to one example of principles described herein. As mentioned above, the weighting system assigns a weight to posts based on an interest attribute. Further, an interest attribute parsing engine parses sentiment information of the posts based on the interest attribute to create parsed sentiment information. As a result, when displaying the parsed sentiment information of the posts to a company for further analysis, the weights assigned to the posts allow the company to better understand the overall sentiment of the posts according to the selected interest attributes such that a company may receive accurate feedback on how their products or services are perceived in the market.

Turning specifically to FIG. 3, in one example, parsed sentiment information (304) is displayed in a display (302) on a user device. In this example, a company is analyzing the public's feeling toward product X. Further, the parsed sentiment information (304) is displayed as a percent (306). In this example, the percent (306) ranges from 0 percent to 100 percent. Further, the parsed sentiment information (304) is displayed according to four groups. In this example, each of the four groups represents the parsed sentiment information (304) with an assigned weight to a specific interest attribute for the posts. For example, a group may be all responses (308) that are posted to a social media website. In this example, the parsed sentiment information (304) is assigned an equal weight for all posts. Further, the parsed sentiment information (304) contains ten percent negative sentiment (310-1) toward product X, twenty-five percent neutral sentiment (310-2) toward product X, and sixty-five percent positive sentiment (310-3) toward product X. As a result, if the parsed sentiment information (304) is assigned an equal weight for all the sentiment information captured, the results may be as shown in FIG. 3.

In keeping with the given example, a group may be for a specific network (312). In this example, parsed sentiment information (304) for the specific network (312) is assigned a greater weight for posts in the specific network than posts outside of the specific network. In this example, the parsed sentiment information (304) contains eight percent negative sentiment (314-1) toward product X, twenty-one percent neutral sentiment (314-2) toward product X, and seventy-one percent positive sentiment (314-3) toward product X. As a result, if the sentiment information is assigned a weight for the posts in the specific network than the posts outside of the specific network, the parsed sentiment information (304) results may be as shown in FIG. 3.

In still keeping with the given example, a group may be for a large social network (316). In this example, the parsed sentiment information (304) for the large social network is assigned a greater weight for posts in the larger network than posts in a smaller network. In this example, the parsed sentiment information (304) contains sixty percent neutral sentiment (318-1) toward product X and forty percent positive sentiment (318-2) toward product X. As a result, if the parsed sentiment information (304) is assigned a greater weight for the posts in the larger social network than the posts in the smaller social network, the results for the parsed sentiment information (304) may be as shown in FIG. 3.

In yet another example, a group may be for selected sources (320). In this example, the parsed sentiment information (304) for the selected sources (320) is assigned a greater weight for posts in the selected sources (320) than posts for other sources. For example, company Z may be of more interest when analyzing parsed sentiment information. As a result, company Z may be included in the selected sources (320). In this example, the parsed sentiment information (304) contains twenty percent negative sentiment (322-1) toward product X, forty percent neutral sentiment (322-2) toward product X, and forty percent positive sentiment (322-3) toward product X. As a result, if the parsed sentiment information (304) is assigned a greater weight for the posts in the selected sources (320) than the posts in other sources, the parsed sentiment information (304) results may be as shown in FIG. 3.

While this example has been described with reference to parsed sentiment information being displayed with four groups, the parsed sentiment information may be displayed with any number of groups. For example, the parsed sentiment information may be displayed with ten groups. Further, while this example has been described with reference to parsed sentiment information being displayed as a bar graph, the parsed sentiment information may be displayed as a graph, a table, a histogram, plots, or combinations thereof.

Figure 4:
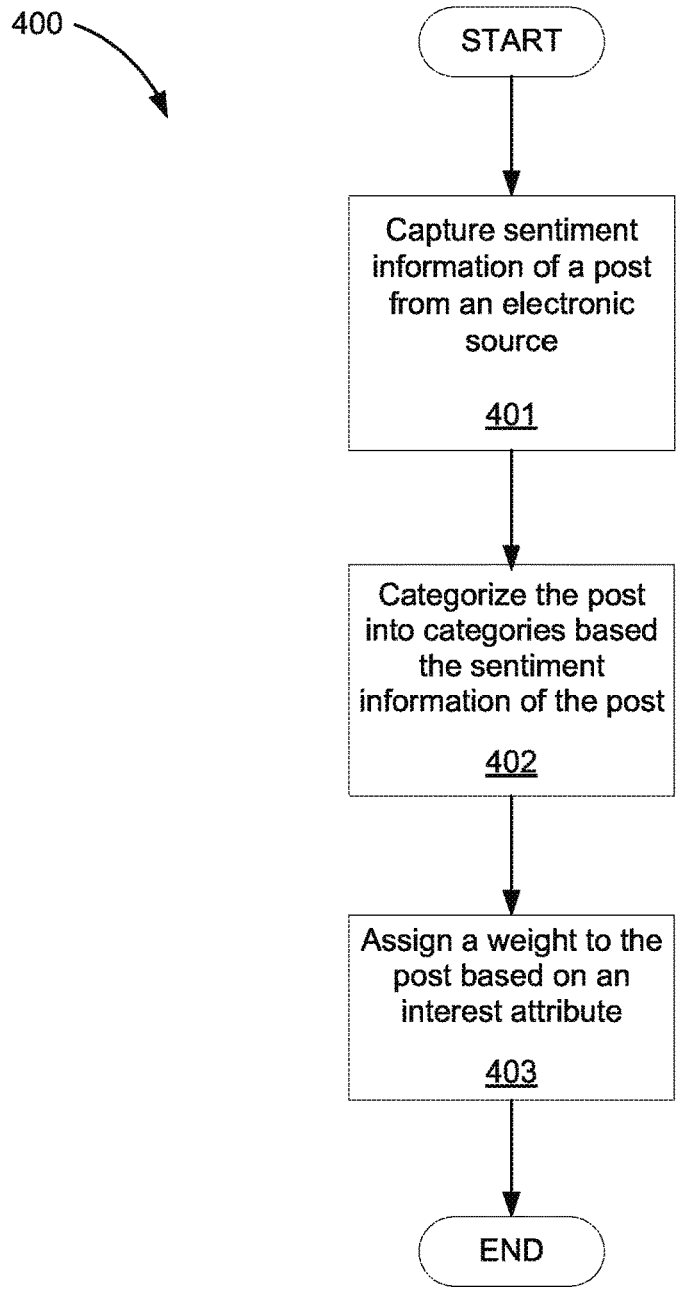
FIG. 4 is a diagram of an example of a method for weighting sentiment information, according to the principles described herein.

FIG. 4 is a diagram of an example of a method for weighting sentiment information, according to the principles described herein. The method (400) for weighting sentiment information includes capturing (401) sentiment information of a post from an electronic source, categorizing (402) the post into categories based on the sentiment information of the post, and assigning (403) a weight to the post based on an interest attribute.

As mentioned above, the method (400) includes capturing (401) sentiment information of a post from an electronic source. In one example, a sentiment capturing engine is used to capture sentiment information from an electronic source. Further, sentiment information may be captured from a post on a social media website, a blog website, a forum website, other website, or combinations thereof.

In one example, the sentiment capturing engine captures sentiment information for all posts from an electronic source. In another example, the capturing engine captures sentiment information from posts that are of interest to a company. In this example, posts that are of interest to the company are indicated by a user that represents a company selecting interest attributes from an interest attribute database. In this example, the sentiment capturing engine uses data text mining to identify posts that are to be captured.

Further, in one example, the sentiment capturing engine stores the sentiment information from the posts in a database to be further processed by the weighting system at a later time. In another example, the sentiment capturing engine captures the sentiment information from the posts in real time to be analyzed by the weighting system in real time.

The method (400) includes categorizing (402) the post into categories based on sentiment information of the post. In one example, the categories for a post include a positive sentiment category, a neutral sentiment category, or a negative sentiment category, or combinations thereof. In one example, if the sentiment information for one post is positive, the post is categorized in the positive sentiment category. In another example, if the sentiment information for one post is neural, the post is categorized in the neutral sentiment category. In yet another example, if the sentiment information for one post is negative, the post is categorized in the negative sentiment category.

Further, the method (400) may use data text mining to identify words in the posts that may indicate if the sentiment for the post is positive, neural, or negative. For example, the words such as like, love, excited, can't wait, other positive words, or combinations thereof may be identified in a post to indicate the post is to be categorized in the positive sentiment category. Further, the words such as hate, boring, not excited, other negative words, or combinations thereof may be identified in a post to indicate the post is to be categorized in the negative sentiment category. Still further, the words such as mediocre, so so, adequate, other neutral words, or combinations thereof may be identified in a post to indicate the post is to be categorized in the neutral sentiment category.

While this example has been described with reference to a post into three categories, a post may be categorized into multiple categories. For example, a post may be categorized into ten categories. Further, categorizes for a post may be a numerical range. For example, 0 to 10, where 0 indicates the post in very negative and 10 indicates the post is very positive. In another example, categorizes for a post may be a symbolic such as, negative, neutral, or positive.

The method (400) further includes assigning (403) a weight to the post based on an interest attribute. As mentioned above, an assigning engine assigns a weight to a post based on an interest attribute. In one example, the assigning engine references an interest attribute database. In this example, the interest attribute database includes a social network identification attribute, a network size attribute, a company name attribute, a job title attribute, a social network weight attribute. As a result, if a user that represents a company assigns a weight to a network size attribute of one-hundred users or less, all posts that have a network size attribute of one-hundred users or less are assigned a weight.

In one example, a weight may be a numerical range. For example, 0 to 10, where 0 indicates no weight is to be assigned to a post and 10 indicates the greatest weight is to be assigned to the post. In another example, a weight may be symbolic. For example, not relevant to very relevant. Further, a weight from one interest attribute may be greater than a weight for another interest attribute. For example, interest attribute X in a network size attribute database may have a greater weight than interest attribute Z in the network size attribute database.

Figure 5:
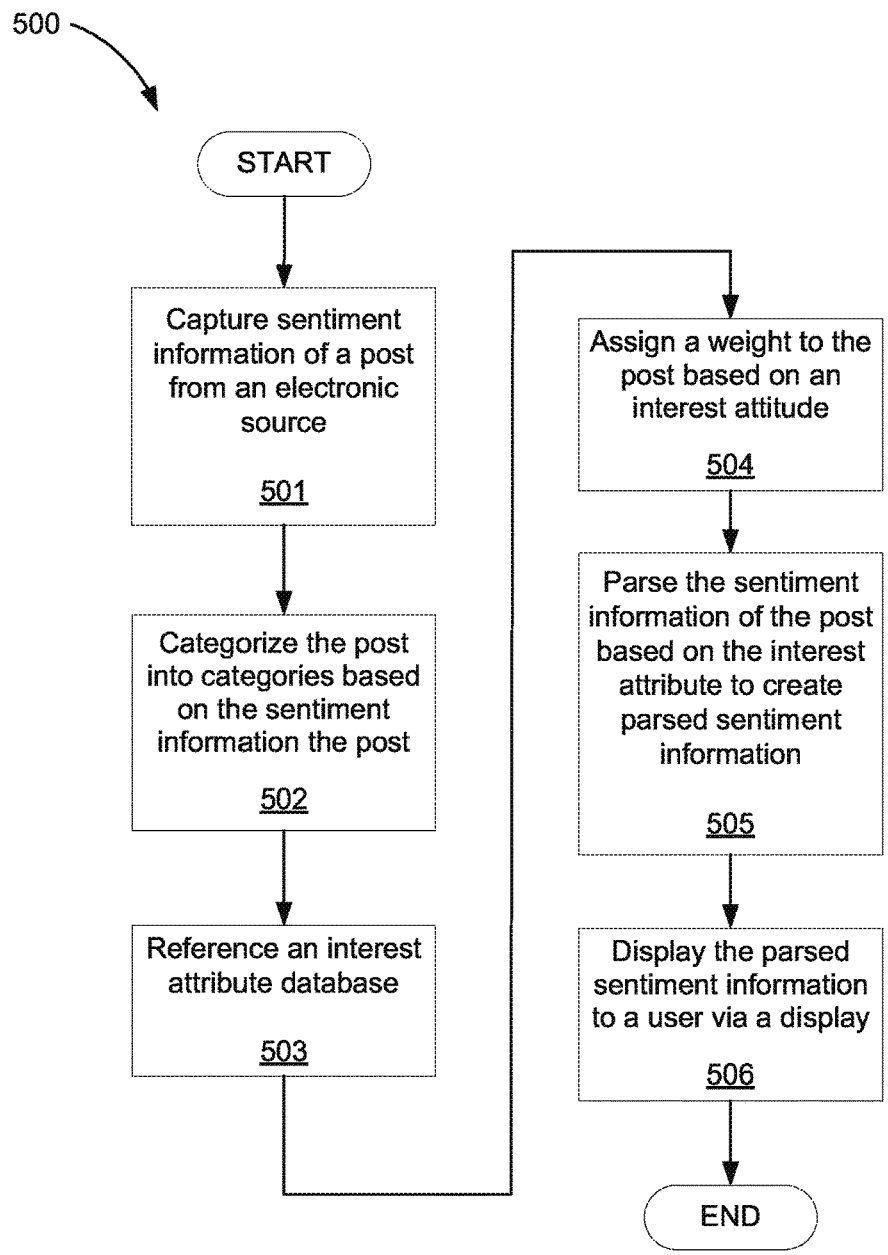
FIG. 5 is a diagram of an example of a method for weighting sentiment information, according to the principles described herein.

FIG. 5 is a diagram of an example of a method for weighting sentiment information, according to the principles described herein. The method (500) for weighting sentiment information includes capturing (501) sentiment information of a post from an electronic source, categorizing (502) the post into categories based on sentiment information of the post, referencing (503) an interest attribute database, assigning (504) a weight to the post based on an interest attribute, parsing (505) the sentiment information of the post based on the interest attribute to create parsed sentiment information, and displaying (506) the parsed sentiment information to a company via a display.

As mentioned above, the method (500) includes referencing (503) an interest attribute database. In one example, an assigning engine references an interest attribute database. In this example, the interest attribute database includes a social network identification attribute, a network size attribute, a company name attribute, a job title attribute, a social network weight attribute. As mentioned above, by referencing the interest attribute database, a user that represents a company is able to select a number of interest attributes that assign a weight to a post.

In one example, the social network identification attribute database contains information about users on a social network. For example, the social network identification attribute database may contain identification names, identification numbers, or combinations thereof for users that have an account on the social network. As a result, if a specific user may be of interest, the social network identification attribute database is referenced to allow a user that represents a company to select a specific user to be assigned a weight.

In one example, the network size attribute database contains different sized networks for a social network. For example, the network size attribute database may contain a network size of one-thousand users. In another example, the network size attribute database may contain a network size of ten-thousand users. As a result, if a specific network size may be of interest, the network size attribute database is referenced to allow a user that represents a company to select a specific network size to be assigned a weight.

In one example, the company name attribute database contains names of different companies. For example, the company name attribute database may contain a company X, company Y, company Z, other company names, or combinations thereof. As a result, if a specific company may be of interest, the company name attribute database is referenced to allow a user that represents a company to select a specific company to be assigned a weight.

In one example, the job title attribute database contains information job titles. For example, a job title attribute database may contain job titles such as chief executive officer, chief financial officer, vice president, president, manager, employee, other job titles, or combinations thereof. As a result, if a specific job title may be of interest, the job title attribute database is referenced to allow a user that represents a company to select a specific job title to be assigned a weight.

In one example, the social network weight database contains information about social networks. For example, the social network weight database may contain social network names such as, social network X, social network Y, social network Z, other social network names, or combinations thereof. As a result, if a specific social network may be of interest, the social network weight database is referenced to allow a user that represents a company to select a specific social network to be assigned a weight.

As mentioned above, the method (500) includes parsing (505) the sentiment information of the post based on the interest attribute to create parsed sentiment information. In one example, the sentiment information of the post may be parsed according to a social network identification attribute, a network size attribute, a company name attribute, a job title attribute, a social network weight attribute or combinations thereof.

The method (500) further includes displaying (506) the parsed sentiment information to a company via a display. In one example, a displaying engine is used to display the parsed sentiment information to a company via a display. In one example, the parsed sentiment information may be displayed as a graph, a table, a histogram, plots, or combinations thereof. As a result, when displaying sentiment information of the posts to a company for further analysis, the weights assigned to the posts allow the company to better understand the overall sentiment of the posts according to the selected interest attributes.

Figure 6:
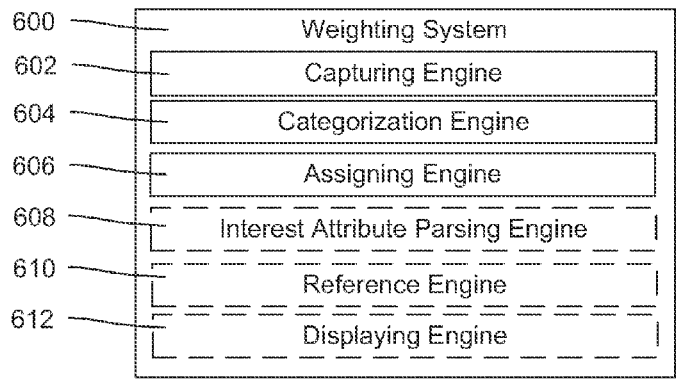
FIG. 6 is a diagram of an example of a weighting system, according to the principles described herein.

FIG. 6 is a diagram of an example of a weighting system (600), according to the principles described herein. The weighting system (600) includes a capturing engine (602), a categorization engine (604), and an assigning engine (606). In this example, the system (600) also includes an interest attribute parsing engine (608), a reference engine (610), and a displaying engine (612). The engines (602, 604, 606, 608, 610, 612) refer to a combination of hardware and program instructions to perform a designated function. Each of the engines (602, 604, 606, 608, 610, 612) may include a processor and memory. The program instructions are stored in the memory and cause the processor to execute the designated function of the engine.

The capturing engine (602) captures sentiment information of a post from an electronic source. In one example, sentiment information may be captured from a post on a social media website. In another example, sentiment information may be captured from a post on a blog, a forum, or combinations thereof.

The categorization engine (604) categorizes the post into categories based on sentiment information. In one example, the categories for the post include a positive sentiment category, a neutral sentiment category, a negative sentiment category, or combinations thereof.

The assigning engine (606) assigns a weight to the post based on an interest attribute. In one example, a weight from one interest attribute may be greater than a weight for another interest attribute.

The interest attribute parsing engine (608) parses the sentiment information of the post based on an interest attribute to create parsed sentiment information. In one example, the sentiment information may be parsed according to a social network identification attribute, a network size attribute, a company name attribute, a job title attribute, a social network weight attribute, or combinations thereof.

The reference engine (610) references an interest attribute database that includes a social network identification attribute, a network size attribute, a company name attribute, a job title attribute, a social network weight attribute, or combinations thereof.

The displaying engine (612) displays the parsed sentiment information to a company via a display. In one example, the parsed sentiment information may be displayed as a graph, a table, a histogram, plots, or combinations thereof.

Figure 7:
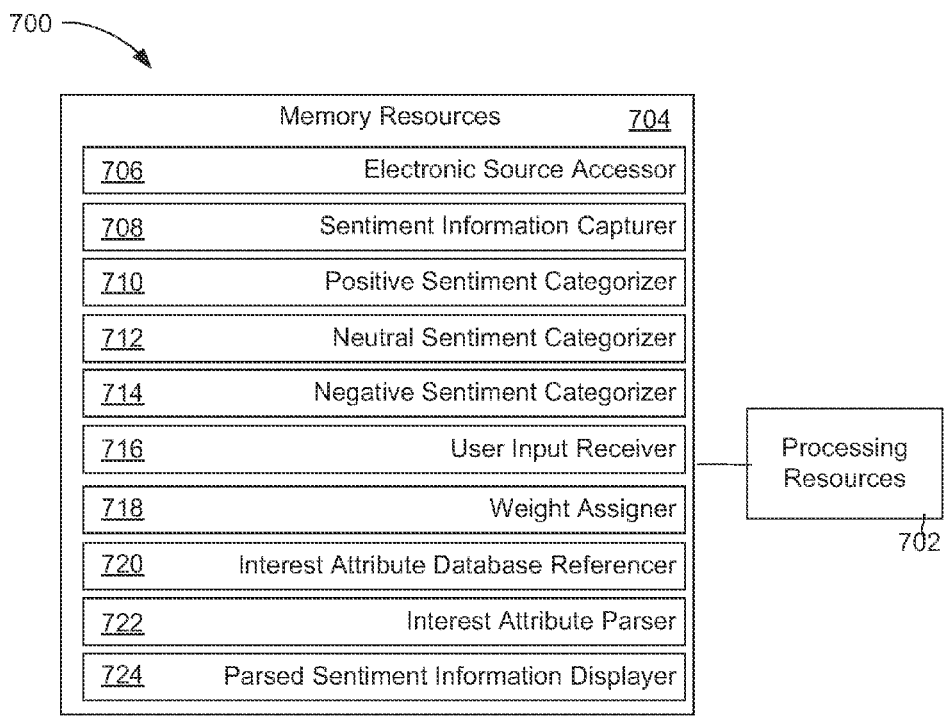
FIG. 7 is a diagram of an example of a weighting system, according to the principles described herein.

FIG. 7 is a diagram of an example of a weighting system (700), according to the principles described herein. In this example, the weighting system (700) includes processing resources (702) that are in communication with memory resources (704). Processing resources (702) include at least one processor and other resources used to process programmed instructions. The memory resources (702) represent generally any memory capable of storing data such as programmed instructions or data structures used by the weighting system (700). The programmed instructions shown stored in the memory resources (704) include an electronic source accessor (706), a sentiment information capturer (708), a positive sentiment categorizer (710), a neutral sentiment categorizer (712), a negative sentiment categorizer (714), a user input receiver (716), a weight assigner (718), a interest attribute database reference (720), a interest attribute parser (722), and a parsed sentiment information displayer (724).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The electronic source accessor (706) represents programmed instructions that, when executed, cause the processing resources (702) to access an electronic source. The sentiment information capturer (708) represents programmed instructions that, when executed, cause the processing resources (702) to capture sentiment information of a post from an electronic source. The positive sentiment categorizer (710) represents programmed instructions that, when executed, cause the processing resources (702) to categorize sentiment information as positive. The neutral sentiment categorizer (712) represents programmed instructions that, when executed, cause the processing resources (702) to categorize sentiment information as neutral. The negative sentiment categorizer (714) represents programmed instructions that, when executed, cause the processing resources (702) to categorize sentiment information as negative.

The user input receiver (716) represents programmed instructions that, when executed, cause the processing resources (702) to receive user input to determine what interest attributes are to be used for assigning a weight to a post. The weight assigner (718) represents programmed instructions that, when executed, cause the processing resources (702) to assign a weight to a post based on an interest attribute. The interest attribute database reference (720) represents programmed instructions that, when executed, cause the processing resources (702) to reference an interest attribute database. The interest attribute parser (722) represents programmed instructions that, when executed, cause the processing resources (702) to parse the sentiment information of the post according to an interest attribute. The parsed sentiment information displayer (724) represents programmed instructions that, when executed, cause the processing resources (702) to display the parsed sentiment information.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the weighting system (700) may be implemented on a user device, on a server, on a collection of servers, or combinations thereof.

The weighting system (700) of FIG. 7 may be part of a general purpose computer. However, in alternative examples, the weighting system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A computer program product for weighting sentiment information, comprising:
   a tangible, non-transitory computer readable storage medium, said tangible computer readable storage medium comprising computer readable program code embodied therewith, said computer readable program code comprising program instructions that, when executed, causes a processor to:
   capture sentiment information from a post about a topic of the post, wherein said post is from an electronic source that comprises an internet website configured for receiving and displaying user-generated content, and wherein said post addresses said topic;
   categorize said post into one of a number of categories based on said sentiment information;
   assign a weight to said post based on an interest attribute of said post, wherein said interest attribute denotes a degree of relevance of said post to said topic; and
   providing intelligence to a user interested in said topic based on combining said weight and which of said categories applies to said post.

2. The computer program product of claim 1, wherein assigning said weight to said post based on said interest attribute further comprising computer readable program code comprising program instructions that, when executed, cause said processor to reference an interest attribute database.

3. The computer program product of claim 2, wherein said interest attribute database comprises a social network identification attribute, a network size attribute, a company name attribute, a job title attribute, a social network weight attribute, or combinations thereof.

4. The computer program product of claim 1, wherein said categories for said post based on said sentiment information includes a positive sentiment category, a neutral sentiment category, a negative sentiment category, or combinations thereof.

5. The computer program product of claim 1, further comprising computer readable program code comprising program instructions that, when executed, cause said processor to parse said sentiment information of said post based on said interest attribute to create parsed sentiment information.

6. The computer program product of claim 5, further comprising computer readable program code comprising program instructions that, when executed, cause said processor to display said parsed sentiment information to a user via a display.

7. The computer program product of claim 6, wherein displaying said parsed sentiment information to a user via a display includes displaying said parsed sentiment information as a graph, a table, a histogram, plots, or combinations thereof.

8. A system for weighting sentiment information, said system comprising a processor and associated memory resources to implement:
   a capturing engine to capture sentiment information of a post to an electronic source that comprises an internet website configured for receiving and displaying user-generated content, wherein content of the post comments on a topic of interest to a user;
   a categorization engine to categorize said post into one of a plurality of categories based on said sentiment information;
   an assigning engine to assign a weight to said post based on an interest attribute of said post, wherein said assigning engine recognizes a set of different interest attributes and receives user input specifying which of said interest attributes should be used to assign said weight to said post, wherein for each user-specified interest attribute that said post possess, weight is assigned to said post; and
   an interest attribute parsing engine to parse said sentiment information of said post and said weight of said post based on said interest attribute to create intelligence that combines said sentiment information and said weight based on selected interest attributes.

9. The system of claim 8, further comprising a reference engine to reference an interest attribute database.

10. The system of claim 9, wherein said interest attribute database comprises a social network identification attribute, a network size attribute, a company name attribute, a job title attribute, a social network weight attribute, or combinations thereof.

11. The system of claim 8, wherein said categories for said post based on said sentiment information includes a positive sentiment category, a neutral sentiment category, a negative sentiment category, or combinations thereof.

12. The system of claim 8, further comprising a display engine to display said intelligence to a user via a display.

13. The system of claim 12, wherein said display engine further displays said parsed sentiment information as a graph, a table, a histogram, plots, or combinations thereof.

14. A system for weighting sentiment information, said system comprising a processor and associated memory resources to implement:
   a categorization engine to categorize said post into categories based on said sentiment information; and
   an assigning engine to assign a weight to said post based on an interest attribute of said post, said interest attribute identifying some aspect of a source from which said post comes;
   said assigning engine implementing rules comprising;
   when said post is made by a specific user, said post is assigned a weight,
   when said post is made by a user from a network of a specific size, said post is assigned a weight,
   when said post is made by a user at a specific company, said post is assigned a weight,
   when said post is made by a user having a specific job title, said post is assigned a weight,
   when said post is made on a specific social network, said post is assigned a weight.

15. The system of claim 14, further comprising a capturing engine to capture said sentiment information of said post from an electronic source.

16. The system of claim 14, wherein assigning said weight to said post based on said interest attribute comprises a reference engine to reference an interest attribute database.

17. The system of claim 16, wherein said interest attribute database comprises a social network identification attribute, a network size attribute, a company name attribute, a job title attribute, a social network weight attribute, or combinations thereof.

18. The system of claim 14, wherein said categories for said post based on said sentiment information includes a positive sentiment category, a neutral sentiment category, a negative sentiment category, or combinations thereof.

19. The system of claim 16, further comprising an interest attribute parsing engine to parse said sentiment information of said post based on said interest attribute to create parsed sentiment information.

20. The system of claim 14, further comprising a user interface with which a user specifies which of the rules will be applied in assigning weight to said post, wherein rules not selected by the user are ignored in assigning weight to said post.

* * * * *